United States Patent
Zielinski

(10) Patent No.: US 11,674,466 B2
(45) Date of Patent: Jun. 13, 2023

(54) METHODS AND SYSTEMS FOR FUEL INJECTOR CONTROL

(71) Applicant: Transportation IP Holdings, LLC, Norwalk, CT (US)

(72) Inventor: David Zielinski, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/353,598

(22) Filed: Jun. 21, 2021

(65) Prior Publication Data

US 2021/0404402 A1 Dec. 30, 2021

Related U.S. Application Data

(60) Provisional application No. 63/045,006, filed on Jun. 26, 2020.

(51) Int. Cl.
| | | |
|---|---|---|
| *F02D 41/20* | (2006.01) | |
| *F02M 63/00* | (2006.01) | |
| *F02D 41/40* | (2006.01) | |
| *B61L 3/00* | (2006.01) | |

(52) U.S. Cl.
CPC ............. *F02D 41/20* (2013.01); *B61L 3/006* (2013.01); *F02D 41/401* (2013.01); *F02D 41/406* (2013.01); *F02M 63/0015* (2013.01); *F02D 2200/021* (2013.01)

(58) Field of Classification Search
CPC ........ F02M 63/0015; F02D 2041/1432; F02D 2041/2034; F02D 2041/2055; F02D 2041/2058; F02D 2200/021; F02D 41/20; F02D 41/40; F02D 41/401; F02D 41/406
See application file for complete search history.

(56) References Cited

U.S. PATENT DOCUMENTS

| | | | | |
|---|---|---|---|---|
| 5,375,575 A | * | 12/1994 | Ohishi ................. | F02M 59/366 123/502 |
| 6,189,514 B1 | * | 2/2001 | Shioi .................... | F02M 41/128 123/502 |
| 7,426,917 B1 | * | 9/2008 | Gallagher ........... | F02D 41/3836 123/492 |
| 10,526,994 B2 | | 1/2020 | Taxon et al. | |
| 2011/0029223 A1 | * | 2/2011 | Mounetou .............. | F02D 41/28 701/114 |
| 2016/0025030 A1 | * | 1/2016 | Ulrey .................. | F02D 41/3854 123/294 |
| 2016/0076498 A1 | * | 3/2016 | Aono ................... | F02D 41/2467 123/490 |

(Continued)

OTHER PUBLICATIONS

Zielinski, D., "Methods and Systems for Diagnosing a Valve," U.S. Appl. No. 17/327,472, filed May 21, 2021, 45 pages.

*Primary Examiner* — Carl C Staubach
(74) *Attorney, Agent, or Firm* — McCoy Russell LLP

(57) ABSTRACT

Methods and systems are provided for detection of a closing time for a solenoid valve. In one example, a method may include monitoring a current of the solenoid valve, filtering the current, and determining the closing time of the solenoid valve based on each of the current and the filtered current. In some examples, the solenoid valve may be an electrically-actuated fuel injection valve. In some examples, determining the closing time may include using the filtered current to determine an inflection point of the current.

18 Claims, 6 Drawing Sheets

(56) References Cited

U.S. PATENT DOCUMENTS

| | | | | |
|---|---|---|---|---|
| 2018/0216566 A1* | 8/2018 | Taxon | ................ | F02D 41/3845 |
| 2019/0345858 A1* | 11/2019 | Zielinski | ............. | F02D 41/1474 |
| 2021/0277845 A1* | 9/2021 | Taxon | ................ | F02D 41/3827 |
| 2021/0396199 A1* | 12/2021 | Zielinski | ............. | F02D 41/3845 |

* cited by examiner

METHODS AND SYSTEMS FOR FUEL INJECTOR CONTROL

CROSS REFERENCE TO RELATED APPLICATIONS

The present application claims priority to U.S. Provisional Application No. 63/045,006, entitled "METHODS AND SYSTEMS FOR FUEL INJECTOR CONTROL," and filed on Jun. 26, 2020. The entire contents of the above-listed application are hereby incorporated by reference for all purposes.

BACKGROUND

Technical Field

Embodiments of the subject matter disclosed herein relate to methods and systems for fuel injector control.

Discussion of Art

Vehicles, such as rail vehicles, include power sources, such as diesel internal combustion engines. The vehicle may include one or more injection pumps in fluid communication with one or more fuel injectors fitted into one or more engine cylinders. A given injection pump may pressurize fuel for delivery to at least one of the one or more fuel injectors. Fuel may then travel to the at least one fuel injector via respective fuel injection valve(s), and then to at least one corresponding engine cylinder of the power source, where fuel may be combusted to provide power to the vehicle.

In some examples, each of the one or more fuel injectors may be included in a respective unit pump fuel injector assembly, wherein each of the one or more engine cylinders may be configured with a respective one of the one or more injection pumps. As a result, fuel injection to each of the one or more engine cylinders may be individually controlled via precision adjustments to a fuel injection timing, a fuel injection advance angle, and an amount of fuel to be injected. To accomplish such precision adjustments, an electrically-actuated solenoid valve fuel injector may be employed, which may receive an electric current responsive to a command to open/close the solenoid valve. The fuel injection timing, the fuel injection advance angle, and the amount of fuel to be injected may correspondingly be adjusted by tuning opening and closing times of the solenoid valve. Once the solenoid valve is determined closed, fuel injection may commence.

By increasing an accuracy of detection of a closing time of the solenoid valve, an efficiency of the power source may correspondingly be increased. Accordingly, various algorithms exist for translating a signature of a measured electric current of the solenoid valve to determine the closing time. As an example, a second derivative of the measured electric current may be determined. Once the second derivative of the electric current increases beyond a threshold value, the solenoid valve may be determined closed, and fuel injection may commence. However, the second derivative of the electric current may be particularly sensitive to low signal-to-noise ratios. As a result, spurious spikes in the second derivative may reach the threshold value in advance of closing of the solenoid valve, thereby reducing control of each of the fuel injection timing, the fuel injection advance angle, and the amount of fuel to be injected. It may therefore be desirable to implement a detection algorithm with greater accuracy and/or lower sensitivity to artifacts.

BRIEF DESCRIPTION

In one embodiment, a method may include monitoring a current of an electrically-actuated solenoid valve, filtering the current, and determining a closing time of the electrically-actuated solenoid valve based on each of the current and the filtered current.

DETAILED DESCRIPTION

Embodiments of the invention are disclosed in the following description, and may relate to systems and methods for detecting a closing time or closing point of a solenoid valve. Such a solenoid valve may be included in an electrically-actuated solenoid valve fuel injector positioned in a vehicle system. Accurate detection of the closing time of the solenoid valve may be desirable to increase efficiency of an engine of the vehicle system. Accordingly, a method is provided for determining the closing time of the solenoid valve by determining an inflection point of the measured electric current with a filtered version of the measured electric current. The inflection point may be interpreted as a change in an inductance of the solenoid valve signifying closing thereof.

Embodiments of the method provided herein may be utilized prior to each fuel injection to provide real-time updating of an accuracy of the closing time. As such, in some embodiments, the closing time may further be monitored for anomalies indicative of solenoid valve degradation. A technical effect of such embodiments is that an efficiency of fuel injection may be improved by accurately characterizing the closing time of the solenoid valve, thereby reducing issues ascribed to undesirably advanced/delayed fuel injection and degraded solenoid valves. Accordingly, vehicle operator frustration may be mitigated, maintenance costs may be minimized, and consistent vehicle operation may be maintained, as fewer components may be replaced over time while maintaining emissions standards and expected fueling.

Figure 1:
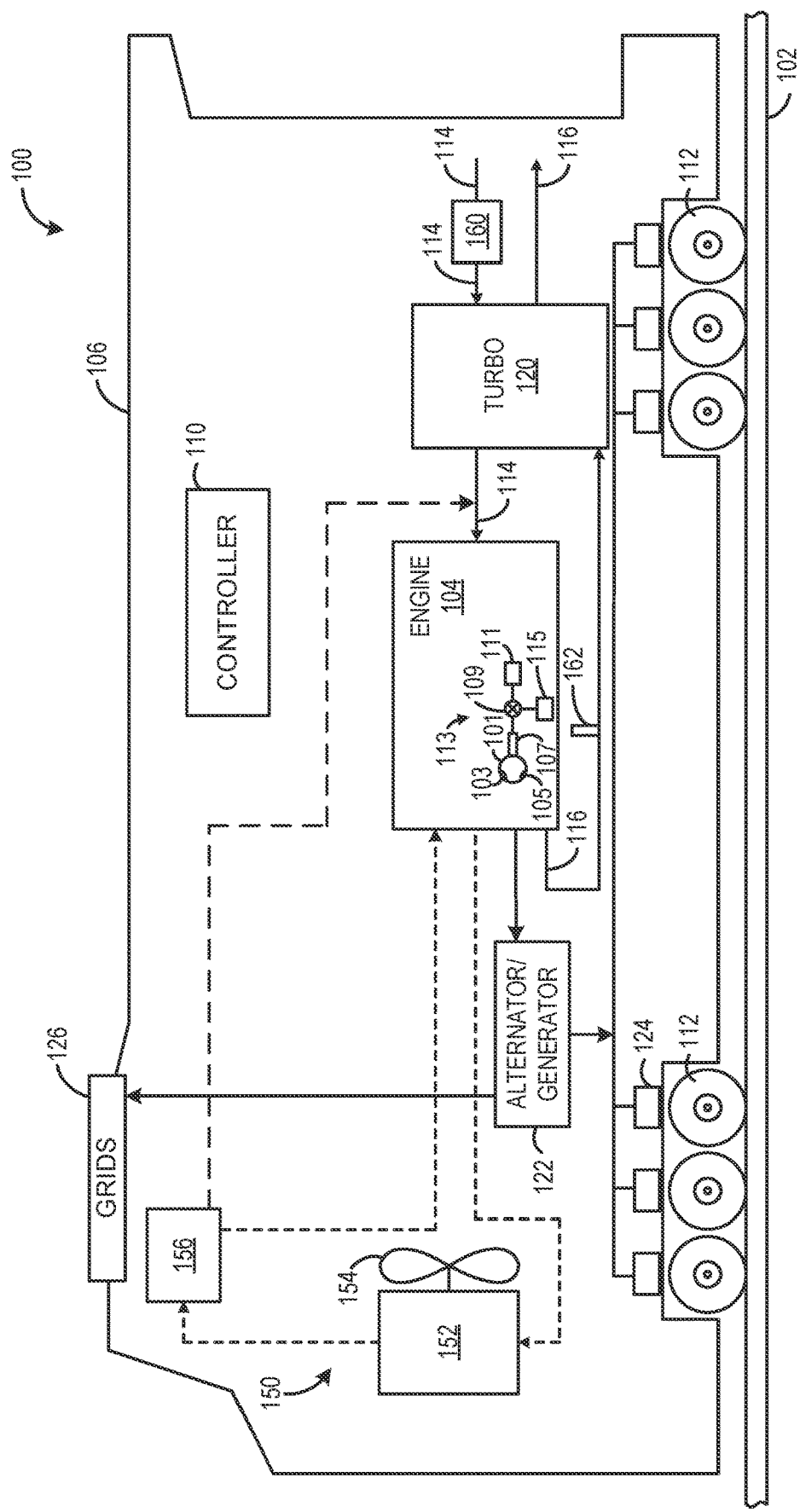
FIG. 1 shows a schematic diagram of a vehicle with one or more electrically-actuated solenoid valve fuel injectors, according to an embodiment of the present disclosure.

FIG. 1 shows an embodiment of a system in which one or more electrically-actuated fuel injectors may be installed. Specifically, FIG. 1 shows a block diagram of an embodiment of a vehicle system 100. In the illustrated example, the engine is coupled to a vehicle and is depicted as a rail vehicle 106 (e.g., locomotive). The vehicle may run on a rail 102 via a plurality of wheels 112. As depicted, the vehicle may include an engine 104. The engine may include a plurality of cylinders 101 (only one representative cylinder shown in FIG. 1) that each include at least one intake valve 103, exhaust valve 105, and fuel injector 107. Each intake valve 103, exhaust valve 105, and fuel injector 107 may include an actuator that may be actuated via a signal from a controller 110 of the engine. In other non-limiting embodiments, the engine may be in a stationary platform. Suitable stationary platforms may include a power-plant application. Other suitable vehicles may include a marine vessel, mining or industrial equipment, on-road vehicles, and off-highway vehicle propulsion systems.

In one embodiment, each fuel injector 107 may be an electrically-actuated fuel injector fluidly coupled to a respective valve 109, such as a proportional solenoid valve or a proportional spool valve, opening and closing of which may be regulated by the controller. Accordingly, the controller may command the valve to be fully closed, fully opened, or a position in between fully closed and fully opened, in order to control fuel flow to the fuel injector at a desired fuel flow rate (as dictated by the controller).

As shown, the valve 109 may further be fluidly coupled to a fuel pump 111, such that liquid fuel may be pumped by the fuel pump to the fuel injector, as regulated by the valve via the controller. Accordingly, relative to the fuel flow, the fuel pump may be disposed upstream of the valve, which may be disposed upstream of the fuel injector. As such, the fuel injector, the valve, and the fuel pump may be included in a unit pump fuel injector assembly 113, the unit pump fuel injector assembly being one of one or more unit pump fuel injector assemblies coupled to a respective one of the plurality of cylinders. As such, fuel injection to each of the one or more engine cylinders may be individually controlled by the controller. For example, the controller may control one or more engine actuators to adjust a fuel injection timing, a fuel injection advance angle, and/or an amount of fuel to be injected to a given cylinder based on monitoring of a corresponding unit pump fuel injector assembly.

The proportional solenoid valve and the proportional spool valve are exemplary embodiments of the at least one valve, though any suitable control element may be employed. For example, a position or state of the valve may be electrically controlled by controlling an electric current of the valve. As another example, a position or state of the valve may be mechanically, hydraulically, hydro-mechanically, electrically, electro-mechanically, magnetically, or electro-magnetically controlled by controlling a servo motor that adjusts the valve.

The engine may receive intake air for combustion from an intake passage 114. The intake passage 114 may include an air filter 160 that filters air from outside of the vehicle. Exhaust gas resulting from combustion in the engine may be supplied to an exhaust passage 116. Exhaust gas may flow through the exhaust passage, and out of an exhaust stack of the rail vehicle. The exhaust passage may include an exhaust gas sensor 162, which may monitor a temperature and/or an air-fuel ratio of the exhaust gas, and which may be coupled to the controller to provide monitoring data thereto.

In one example, the engine may be a diesel engine that combusts air and diesel fuel through compression ignition. In another example, the engine may be a dual or multi-fuel engine that may combust a mixture of gaseous fuel and air upon injection of diesel fuel during compression of the air-gaseous fuel mixture. In other non-limiting embodiments, the engine may additionally combust fuel including gasoline, kerosene, natural gas, biodiesel, or other petroleum distillates of similar density through compression ignition (and/or spark ignition).

A suitable rail vehicle may be a diesel-electric locomotive. Suitable diesel-electric locomotives may include mainline haulers, heavy haul freight haulers, passenger rail vehicles, shunters, switchers, and the like. The diesel-electric locomotive may include other power sources, such as hybrid electric (batteries), fuel cells, hydrogen engines, and the like. While diesel is used as an example fuel, other fuels may be used. Suitable other fuels may include gasoline, kerosene, ethanol, biodiesel, natural gas, and combinations of the foregoing. As depicted in FIG. 1, the engine may be coupled to an electric power generation system, which includes an alternator/generator 122 and a plurality of electric traction motors 124. For example, the engine may be a diesel and/or natural gas engine that generates a torque output which may be transmitted to the alternator/generator, the alternator/generator being mechanically coupled to the engine. In one embodiment herein, the engine 104 may be a multi-fuel engine operating with diesel fuel and natural gas.

Electrical power produced by the alternator/generator may be stored and applied for subsequent propagation to a variety of downstream electrical components. As an example, the alternator/generator may be electrically coupled to the plurality of electric traction motors and the alternator/generator may provide electrical power to the plurality of electric traction motors. As depicted, each of the plurality of electric traction motors may be coupled to one of the plurality of wheels to provide tractive power to propel the rail vehicle. One example configuration may include one electric traction motor per wheel set (e.g., a subset of the plurality of wheels). As depicted herein, six electric traction motors may correspond to each of six pairs of motive wheels of the rail vehicle. In another example, the alternator/generator may be coupled to one or more resistive grids 126. The resistive grids may dissipate excess engine torque via heat produced by the grids from electricity generated by the alternator/generator. Additionally or alternatively, the resistive grids may be used in dynamic braking mode to dissipate electricity generated by the traction motors.

In some embodiments, the vehicle system may include a turbocharger 120 arranged between the intake passage 114 and the exhaust passage 116. The turbocharger may increase air charge of ambient air drawn into the intake passage to provide greater charge density during combustion to increase power output and/or engine-operating efficiency. The turbocharger may include at least one compressor (not shown) which may be at least partially driven by at least one corresponding turbine (not shown). In some embodiments, the vehicle system may include an aftertreatment system coupled in the exhaust passage upstream and/or downstream of the turbocharger. In one embodiment, the aftertreatment system may include a diesel oxidation catalyst (DOC) and/or a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or exhaust aftertreatment systems.

As depicted in FIG. 1, the vehicle system may include a thermal management system 150 (e.g., engine cooling system). The cooling system may circulate coolant (e.g., water, glycol, etc.) through the engine to absorb waste engine heat and distribute the heated coolant to a heat exchanger, such as a radiator 152 (e.g., radiator heat exchanger). A suitable coolant may be water. A fan 154 may be coupled to the radiator to maintain an airflow through the radiator when the vehicle is moving slowly or stopped while the engine is running. In some examples, a speed of the fan may be controlled by the controller. Coolant which is cooled by the radiator may enter a tank (not shown). The coolant may then be pumped by a water, or coolant, pump 156 back to the engine or to another component of the vehicle system.

The controller may control various components related to the vehicle. As an example, various components of the vehicle system may be coupled to the controller via a communication channel or data bus. In one example, the controller may include a computer control system. The controller may additionally or alternatively include a memory holding non-transitory computer readable storage media (not shown) including code for enabling on-board monitoring and control of rail vehicle operation. In some examples, the controller may include more than one controller each in communication with one another, such as a first controller to control the engine and a second controller to control other operating parameters of the rail vehicle (such as tractive motor load, blower speed, etc.). The first controller may control various actuators based on output received from the second controller and/or the second controller may control various actuators based on output received from the first controller.

The controller may receive information from a plurality of sensors and may send control signals to a plurality of actuators. The controller, while overseeing control and management of the engine and/or rail vehicle, may receive signals from a variety of engine sensors, as further elaborated herein, in order to determine operating parameters and operating conditions, and correspondingly adjust various engine actuators to control operation of the engine and/or the rail vehicle. For example, the controller may receive signals from various engine sensors including, but not limited to, engine speed, engine load, intake manifold air pressure, boost pressure, exhaust pressure, ambient pressure, ambient temperature, exhaust gas temperature, exhaust gas air-fuel ratio, particulate filter temperature, particulate filter backpressure, engine coolant pressure, or the like. In some embodiments, the various engine sensors may include a current sensor 115 coupled to each fuel injection valve 109 to measure a current thereat, the current sensor communicably coupled to the controller and configured to send such current measurements thereto. Additional sensors, such as coolant temperature sensors, may be positioned in the cooling system. Correspondingly, the controller may control the engine and/or the rail vehicle by sending commands to various components such as the plurality of electric traction motors, the alternator/generator, the fuel injectors, valves (e.g., valve 109), the coolant pump, or the like. For example, the controller may control the operation of a restrictive element (e.g., such as a valve) in the engine cooling system. Other actuators controllable by the controller may be coupled to various locations in the rail vehicle.

In one example, and as described in detail with reference to FIG. 2, a method is provided for determining the closing time of the fuel injection valve based on each of a measured current and a filtered current. In some examples, the closing time may be based on an inflection point of the measured current. Examples of determining the inflection point are graphically represented by the plots of FIGS. 4A and 4B. In alternate examples, and as described below with reference to FIGS. 3A and 3B, the closing time may be based on a second derivative of the measured current, which may have a lower signal-to-noise ratio than the filtered current.

Figure 2:
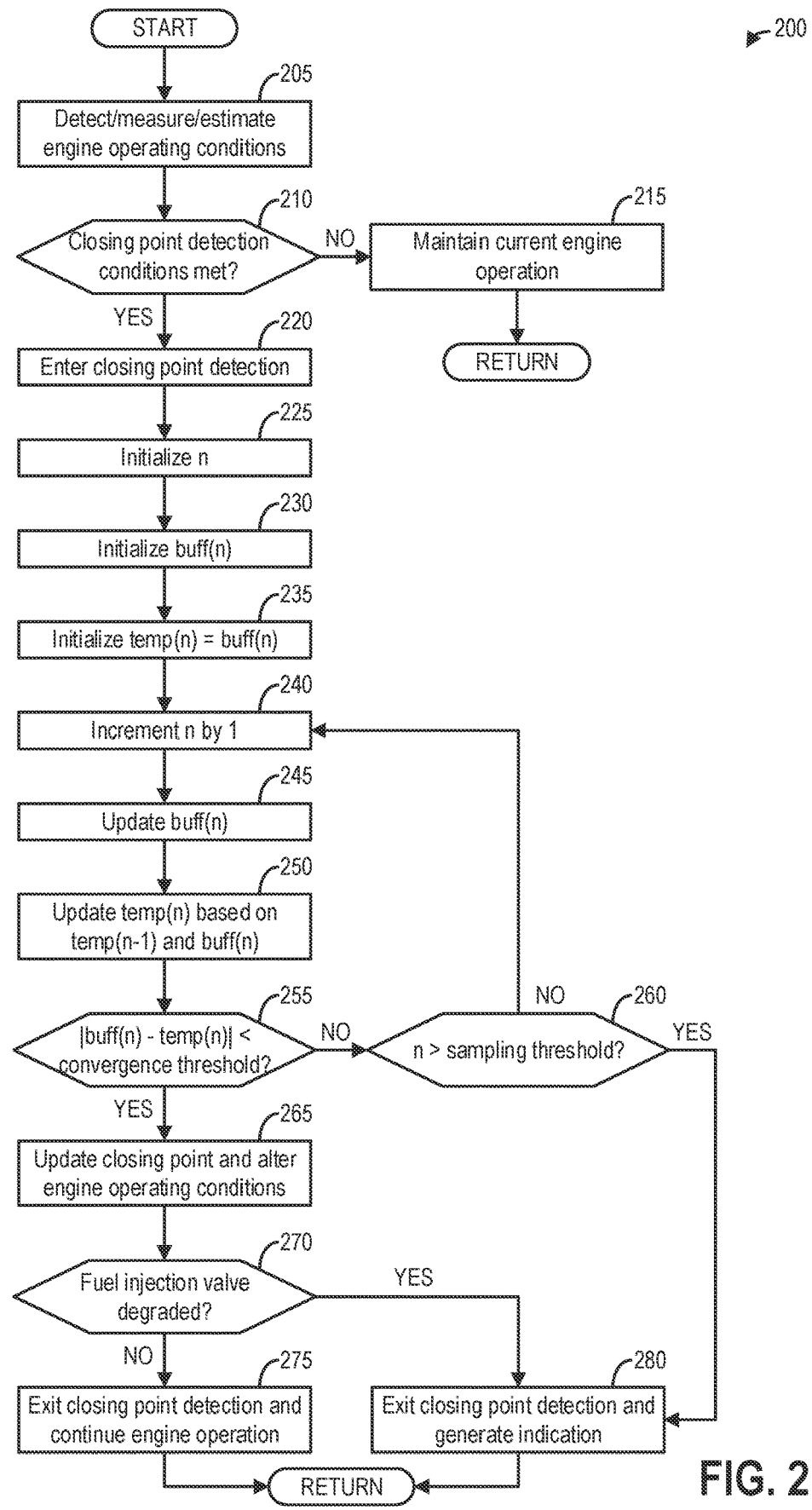
FIG. 2 shows a flow chart of a method for detecting closing times of the one or more electrically-actuated solenoid valve fuel injectors, according to an embodiment of the present disclosure.

Referring now to FIG. 2, a flow chart is depicted, showing a method 200 for detecting a closing point of a fuel injection valve. In some examples, the fuel injection valve may be an electrically-actuated solenoid valve in a unit pump fuel injector assembly. As an example, the fuel injection valve may be the valve 109 of FIG. 1. A current of the fuel injection valve may be measured and filtered (for example, with a low-pass filter) or otherwise mathematically attenuated. The measured current and the filtered current may be monitored to determine an inflection point of the measured current, which may indicate an inductance change corresponding to the closing point (e.g., a point at which motion of the fuel injection valve has substantially stopped). The closing point may then be used to ensure that desired fuel injection timing, fuel injection advance angle, and amount of fuel to be injected are implemented as expected.

Specifically, as a difference between closing of the fuel injection valve and initiation of fuel injection (e.g., a needle lift of the fuel injector) may be both small and difficult to predict, the closing point of the fuel injection valve may be effectively substituted by the controller as a nearest time point to initiation of fuel injection (since the closing point of the fuel injection valve may correspond to a time point at which the fuel injector is exposed to a greatest upstream fuel pressure or fuel flow delivered by the fuel pump). Numerous additional factors may determine actual fuel delivery to the cylinder, including a camshaft pressure, an overall fuel pump pressure, a fuel pressure at an inlet of the fuel pump, the injection timing, a volume of fuel within injection lines of the unit pump fuel injector assembly (equivalent to the amount of fuel to be injected in some examples), a physical configuration of the fuel injection valve, and combinations thereof. For example, depending on engine application and operating mode, initiation of fuel injection may begin prior to the closing of the fuel injection valve (e.g., some fuel may enter the cylinder while the fuel injection valve is open) or fueling may be delayed until the fuel injection valve is determined closed.

In additional or alternative examples, the closing point may be periodically updated during engine operation in order to monitor and diagnose degradation of the fuel injection valve. In one example, an expected closing point may be determined via simulation and/or testing (experimental) data (e.g., stored in a map or lookup table), whereby a detected closing point may be compared to the expected closing point to diagnose degradation of the fuel injection valve.

Instructions for carrying out method 200 may be executed by a controller, such as the controller 110 of FIG. 1, based on instructions stored on a memory of the controller and in conjunction with signals received from sensors of an engine system, such as current sensors coupled to the fuel injection valve. Further, the controller may employ engine actuators of the engine system to adjust engine operation, according to method 200 as described below. The instructions for carrying out method 200 and commands to engine actuators generated therefrom may be executed automatically by the controller and the engine system (following an operator command, at preset intervals, and/or under preset conditions). Further, though method 200 is described below with reference to one fuel injection valve, method 200 may be applied in series or parallel to a plurality of similarly configured fuel injection valves in a vehicle system. Accordingly, exemplary embodiments of method 200 may enable closing point detection and monitoring of one or more electrically-actuated solenoid valves in a unit pump fuel injector assembly.

At 205, method 200 may include detecting and/or estimating and/or measuring one or more engine operating conditions. As examples, the one or more engine operating conditions may include engine speed, engine load, engine temperature, ambient conditions (e.g., ambient temperature, pressure, humidity, etc.), current operator torque demand, manifold pressure, manifold air flow, fuel temperature, exhaust gas air-fuel ratio, etc. The one or more engine operating conditions may be measured by one or more sensors communicatively coupled to the controller (e.g., the exhaust gas air-fuel ratio may be measured directly via the exhaust gas sensor 162) or may be inferred based on available data (e.g., the engine temperature may be estimated from an engine coolant temperature measured by an engine coolant temperature sensor).

The controller may use the one or more engine operating conditions to infer a current state of engine operation, and then determine whether the current state of engine operation is suitable for executing closing point detection. Specifically, at 210, method 200 may include determining whether one or more closing point detection conditions are met. For example, the one or more closing point detection conditions may include initiation of a fueling request received at the controller, a threshold duration having elapsed since last determining the closing point, an engine temperature being within a predetermined temperature range, etc. In one example, closing point detection may be initiated each time a given fuel injector (in a given unit pump fuel injector assembly associated with a given cylinder) is commanded to inject fuel. In another example, closing point detection may be initiated when the engine temperature is higher than a first threshold temperature and/or lower than a second threshold temperature, the first threshold temperature being lower than the second threshold temperature. If the one or more closing point detection conditions are not met, method 200 may proceed to 215, where method 200 may include maintaining current engine operation. In such examples, closing point detection may not be initiated.

If the one or more closing point detection conditions are met, method 200 may proceed to 220, where method 200 may include entering closing point detection. Specifically, the controller may command the fuel injection valve open by applying an actuation voltage. Concurrently, or during a predetermined window following opening of the fuel injection valve, the controller may receive sampling data periodically or substantially continuously from a current sensor coupled to the fuel injection valve. Accordingly, in some examples, the sampling data may be a measured current of the fuel injection valve.

In some examples, the predetermined window may be based on a maximum number of samples, or a sampling threshold. Accordingly, the predetermined window may be less than or equal to a sampling duration determined as the product of the sampling threshold and a sampling rate. The sampling duration may be determined based on an amount of time the fuel injection valve is expected to be open. For example, the sampling duration may be staggered following a commanded opening of the fuel injection valve such that the closing time may be captured within the sampling duration (e.g., the sampling duration may be selected to ensure that the fuel injection valve has sufficient time to open, remain open for passing fuel to the fuel injector, and close). In some examples, the amount of time the fuel injection valve is expected to be open may be determined at least based on a fuel pressure at an inlet of the fuel injection valve (which may further be a function of each of low-side fuel system pressure and pump speed) and the amount of fuel to be injected (which may further be a function of a torque/power demand).

As discussed above, the closing point may be determined once the inflection point of the measured current is identified. In some examples, the inflection point may be identified when the measured current and the filtered current are within a threshold value of one another. In one example, the inflection point may be identified when the measured current and the filtered current are substantially equal to one another. Accordingly, the closing point detection may be based on an iterative algorithm which iterates up to n sampling steps until convergence is reached.

Accordingly, the closing point detection may begin with initialization of one or more variables. Specifically, at 225, the method 200 may include initializing n (e.g., to 0 or 1), that is, indexing a first iteration. At 230, the method 200 may include initializing buff(n) based on the sampling data. In some examples, buff(n) may be a first buffer stored in the memory of the controller, where buff(n) may hold the measured current for a current iteration. At 235, method 200 may include initializing temp(n)=buff(n). In some examples, temp(n) may be a second buffer stored in the memory of the controller, where, for iterations beyond the first iteration, temp(n) may hold the filtered current for a current iteration (see 250 below).

Once the one or more variables are initialized, the iterative algorithm may be initiated, and the one or more variables may be iteratively updated until convergence is reached. At 240, method 200 may include incrementing n by 1. At 245, method 200 may include updating buff(n) based on the sampling data. For example, buff(n) may be updated with the measured current of the current iteration. At 250, method 200 may include updating temp(n) based on temp (n−1) and buff(n) (e.g., the second buffer for the current iteration may be updated based on the second buffer for a most recent iteration prior to the current iteration and the first buffer for the current iteration). In some examples, a low-pass filter may be applied to buff(n) to update temp(n). In such examples, temp(n) may be determined as:

$$\text{temp}(n) = FF \cdot \text{temp}(n-1) + (1-FF) \cdot \text{buff}(n) \tag{1}$$

where FF is a calibratable filter factor which may be adjusted for a given engine application (where "application" is used here in the sense of how much power the engine is outputting and under what conditions), valve assembly configuration (where "configuration" is used here in the sense of how components of the valve assembly are assembled together and interact with one another mechanically, electrically, fluidically, etc.), engine configuration (where "configuration" is used here in the sense of how components of the engine are assembled together and interact with one another mechanically, electrically, fluidically, etc.), etc. In one example, FF=0.5. In some examples, lag inherent to the low-pass filter may be leveraged to account for any differences between the closing of the fuel injection valve and initiation of fuel injection.

In some examples, a mathematical form and/or parameters (e.g., the calibratable filter factor) of the low-pass filter may be adjusted based on simulation and/or testing (experimental) data. For example, the simulation and/or testing data may be gathered based on each of idle and rated power (e.g., high-power) conditions, from which other operating modes may be extrapolated/approximated. The simulation and/or testing data may be additionally or alternatively selected such that the low-pass filter may account for outlier, as well as common, operational modes or circumstances of the fuel injection valve. In one example, inductance/resistance (for both outlier and common operational modes or circumstances), in addition to one or more of a spring constant, a mass, and friction of the fuel injection valve, may be used to formulate the low-pass filter and determine electrical characteristics of a signature of the measured current.

At 255, method 200 may include determining whether an absolute difference between buff(n) and temp(n) is less than a convergence threshold. The convergence threshold may be adjusted by an operator or a manufacturer of the vehicle system to an arbitrary level of precision. For example, the convergence threshold may be selected to balance a desired accuracy of the closing point with any noise in the measured and filtered currents. Though an absolute difference based convergence threshold is employed at 255, additional or alternative convergence criteria (for example, a dynamically scalable factor, a root-mean-square deviation, etc.) may be employed in other examples.

If the absolute difference between buff(n) and temp(n) is greater than or equal to the convergence threshold, method 200 may proceed to 260, where method 200 may include determining whether n is greater than the sampling threshold. In some examples, the sampling threshold may correspond to a maximum number of samples taken during the predetermined window. The maximum number of samples may correspond to the sampling duration divided by the sampling rate. In one example, the maximum number of samples may be 150. In an additional or alternative example, the sampling rate may be 100 kHz. If n is less than or equal to the sampling threshold, method 200 may return to 240 to continue the iterative algorithm by incrementing n by 1.

If n is greater than the sampling threshold, method 200 may proceed to 280, where method 200 may include exiting closing point detection and generating a first driver indication, storing a first diagnostic code, and/or alter one or more engine operating conditions based on the first driver indication and/or the first diagnostic code. The first driver indication and/or the first diagnostic code may indicate to an operator, manufacturer, technician, etc. that the closing point was not detected during the predetermined window and that the fuel injection valve may be degraded. In such examples, the closing point may not be updated.

In one example, the first driver indication may include lighting a malfunction indicator lamp (MIL) and the first diagnostic code may be set and stored in the memory of the controller. Lighting the MIL may indicate a request that the vehicle system be serviced, and the first diagnostic code that is set may indicate to a technician that the fuel injection valve is degraded. The MIL and the first diagnostic code may then reset after the vehicle system has been serviced (e.g., after the fuel injection valve has been replaced).

Returning to 255, if the absolute difference between buff(n) and temp(n) is less than the convergence threshold, the inductance change may be detected and method 200 may proceed to 265, where method 200 may include updating the closing point (e.g., stored in the memory of the controller) and altering one or more engine operating conditions. As an example, initiation of fuel injection may be advanced or delayed during subsequent fuel injection events based on the updated closing point. As another example, a fuel injection advance angle may be increased or decreased during subsequent fuel injection evens based on the updated closing point. As yet another example, an amount of fuel to be injected may be increased or decreased during subsequent fuel injection events based on the updated closing point. Updating the closing point may further include incrementing an aging counter by one. As such, in some examples, the aging counter may track a total number of fuel injection cycles of the fuel injection valve for determination or prediction of degradation past a useful life.

At 270, method 200 may include determining whether the fuel injection valve is degraded. In some examples, the closing point (as updated at 265) may be compared to an expected closing point (e.g., stored in a map or lookup table). For instance, the fuel injection valve may be determined degraded if a difference between the (detected) closing point and the expected closing point is greater than a threshold difference. In additional or alternative examples, the aging counter (as incremented at 265) may be compared to a threshold count. For instance, the fuel injection valve may be determined degraded if the aging counter is greater than a threshold count. If the fuel injection valve is determined to be not degraded, method 200 may proceed to 275, where method 200 may include exiting closing point detection and continuing engine operation (e.g., operating the engine without actively processing and filtering sampling data). In such examples, the fuel injection valve may be indicated as not degraded.

If the fuel injection valve is determined to be degraded, method 200 may proceed to 280, where method 200 may include exiting closing point detection and generating a second driver indication, storing a second diagnostic code, and/or alter one or more engine operating conditions based on the second driver indication and/or the second diagnostic code. The second driver indication and/or the second diagnostic code may indicate to an operator, manufacturer, technician, etc. that the closing point detection has been that the fuel injection valve may be degraded.

In one example, the second driver indication may include lighting the MIL and the second diagnostic code may be set and stored in the memory of the controller. Lighting the MIL may indicate a request that the vehicle system be serviced, and the second diagnostic code that is set may indicate to a technician that the fuel injection valve is degraded. The MIL and the second diagnostic code may then reset after the vehicle system has been serviced (e.g., after the fuel injection valve has been replaced).

Method 200 is not limited to fuel injection valves and may be applied for use with other solenoid valve implementations. Further, method 200 may be applied to detection and monitoring of inductance changes in other electrically-actuated components (e.g., besides solenoid valves).

Figure 3A:
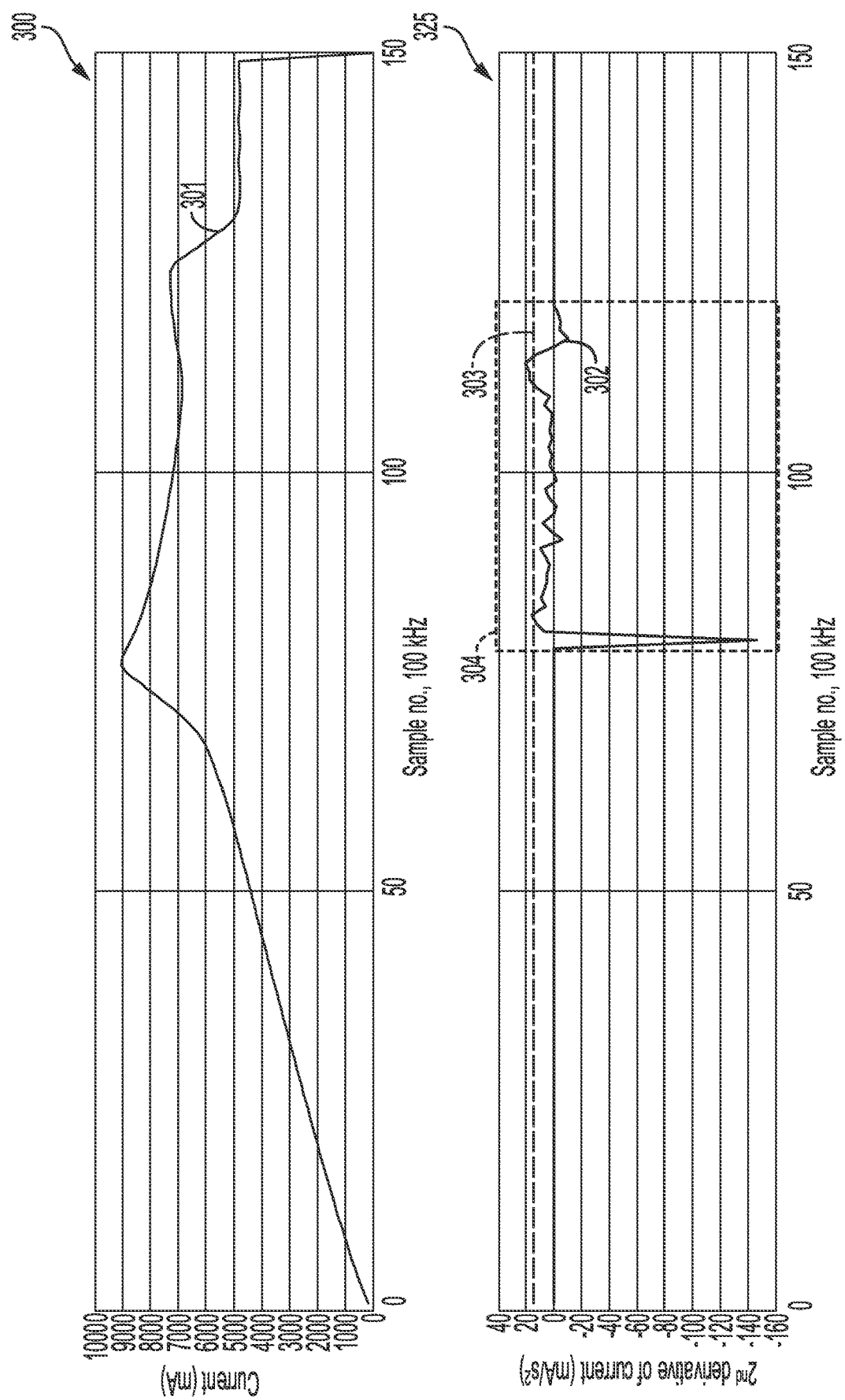
FIGS. 3A and 3B show plots of measured electric currents, and second derivatives thereof, of an exemplary solenoid valve, illustrating detection of anomalous closing times provided by some detection algorithms.
Figure 3B:
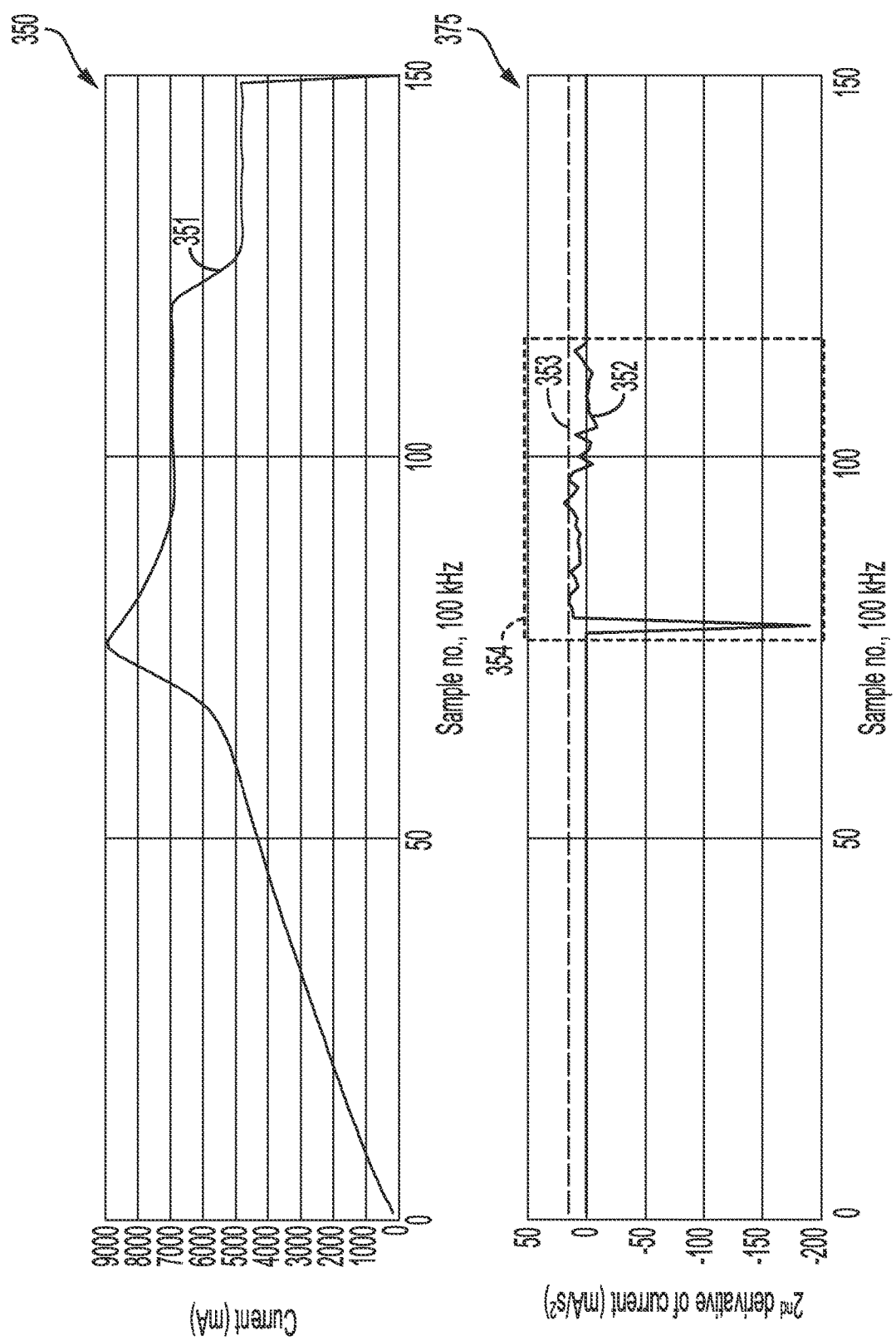

Referring now to FIGS. 3A and 3B, plots of measured electric currents, and second derivatives thereof with respect to time, of an exemplary solenoid valve included in a locomotive are shown. FIG. 3A shows plots 300 and 325, which depict the measured electric current and the second derivative of the measured current, respectively, for the exemplary solenoid valve at idle operation of the locomotive. FIG. 3B shows plots 350 and 375, which depict the measured electric current and the second derivative of the measured current, respectively, for the exemplary solenoid valve at rated power operation of the locomotive (e.g., at a notch N8). The measured current (in mA) is represented by a respective ordinate of the plots 300 and 350, the second derivative of the measured current (in mA/s$^2$) is represented by a respective ordinate of the plots 325 and 375, and a sample number is represented by a respective abscissa of the plots 300, 325, 350, and 375. Samples may be collected at a predetermined sampling rate, such as 100 kHz. In the plots 300 and 350, curves 301 and 351 respectively depict the measured current. In the plots 325 and 375, curves 302 and 352 respectively depict the second derivative of the measured current. Further, in the plots 325 and 375, curves 303 and 353 respectively depict a positive threshold which, when exceeded by the second derivative of the measured current, may indicate a closing point of the exemplary solenoid valve in some detection algorithms. The second derivative of the measured current may be determined during a predetermined window, as approximated by dashed boxes 304 and 354 in the plots 325 and 375, respectively.

Plots 325 and 375 illustrate detection of anomalous closing points provided by an exemplary detection algorithm. As shown, the second derivative of the measured current (curves 302 and 352) may have a relatively low signal-to-noise ratio, such that the second derivative of the measured current may anomalously and unexpectedly increase above the positive threshold (curves 303 and 353). In some examples, and as shown in each of the plots 325 and 375, the second derivative of the measured current may exceed the positive threshold multiple times during the predetermined window (dashed boxes 304 and 354), resulting in premature detection of the closing point and obfuscating an actual closing point.

Figure 4A:
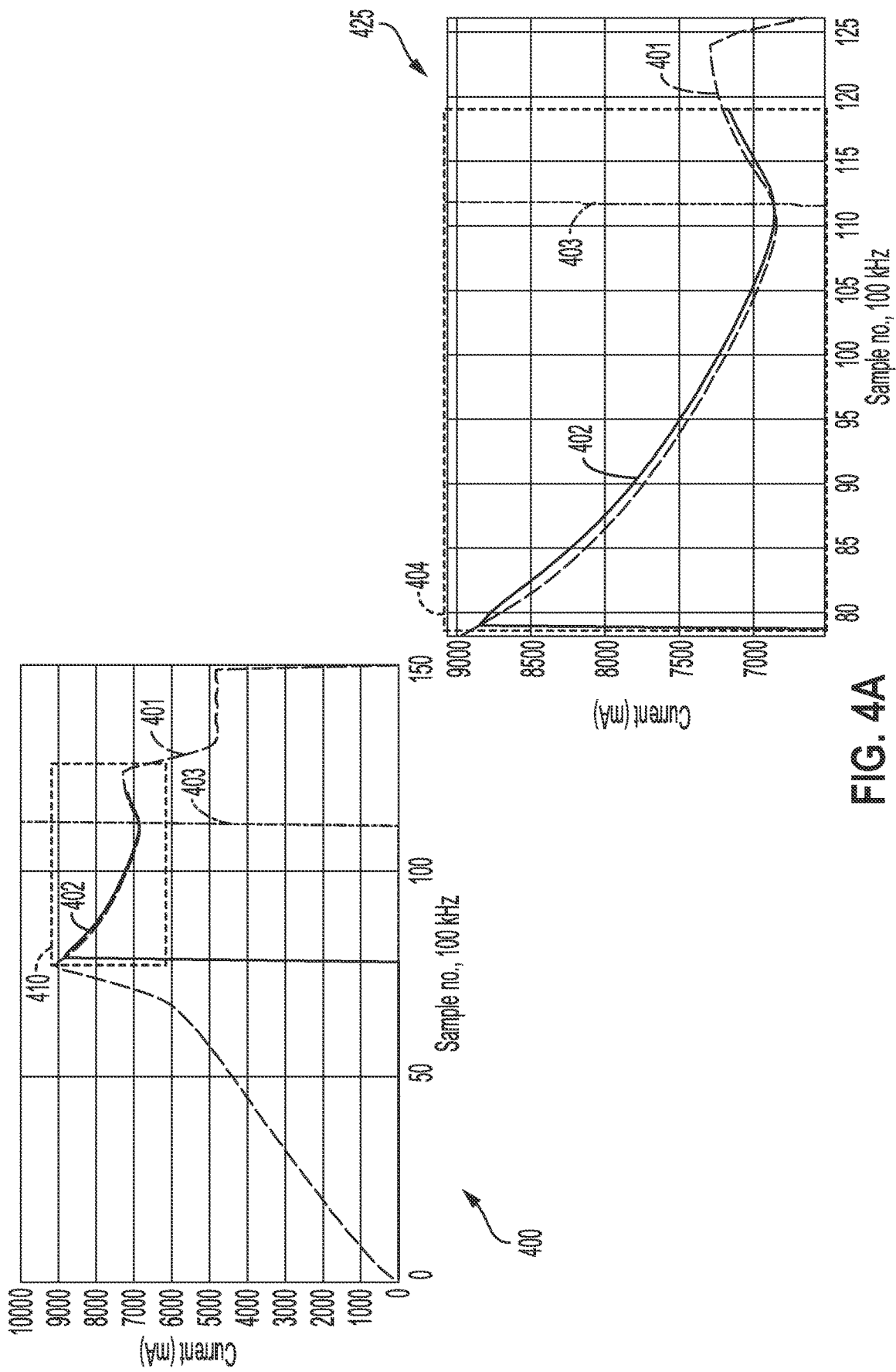
FIGS. 4A and 4B show plots of measured electric currents and filtered electric currents of an exemplary solenoid valve, where the filtered electric current may be leveraged to determine a closing time of the exemplary solenoid valve, according to an embodiment of the present disclosure.
Figure 4B:
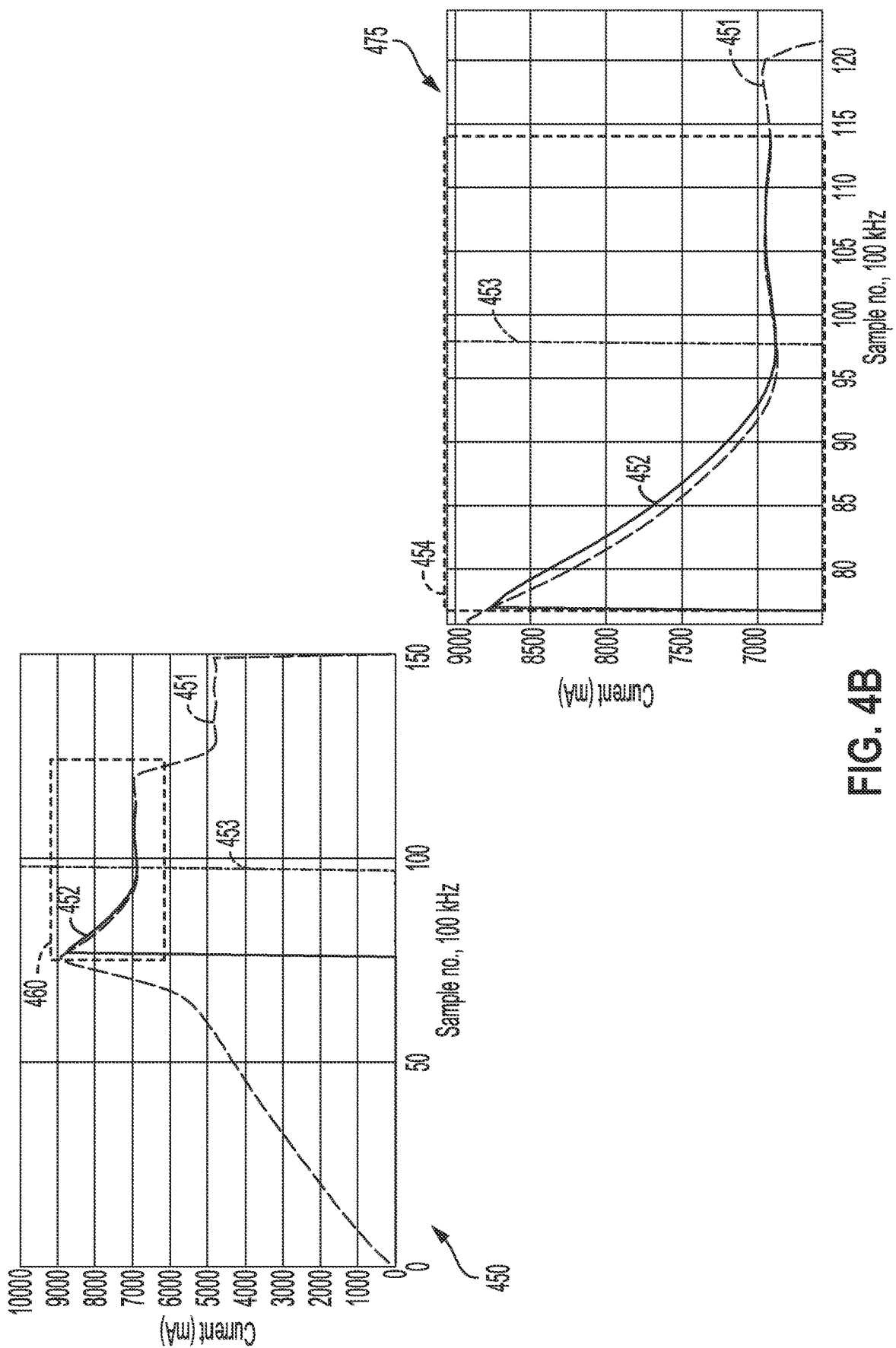

Referring now to FIGS. 4A and 4B, plots of measured and filtered electric currents of an exemplary solenoid valve included in a locomotive are shown. FIG. 4A shows plot 400, which depicts the measured and filtered electric currents for the exemplary solenoid valve at idle operation of the locomotive. Plot 425, also shown at FIG. 4A, depicts an expanded view of inset 410 of the plot 400. FIG. 4B shows plot 450, which depicts the measured and filtered electric currents for the exemplary solenoid valve at rated power operation of the locomotive (e.g., at a notch N8). Plot 475, also shown at FIG. 4B, depicts an expanded view of inset 460 of the plot 450. The measured current (in mA) is represented by a respective ordinate of the plots 400, 425, 450, and 475, and a sample number is represented by a respective abscissa of the plots 400, 425, 450, and 475. Samples may be collected at a predetermined sampling rate, such as 100 kHz. In the plots 400 and 450, curves 401 and 451 respectively depict the measured current, curves 402 and 452 respectively depict the filtered current, and curves 403 and 453 respectively depict an inflection point of the measured current, which may indicate a closing point of the exemplary solenoid valve in the detection algorithm provided by the embodiments described herein. Specifically, the inflection point of the measured current may be determined by the detection algorithm where the filtered current meets the measured current. The filtered current may be obtained by applying a low-pass filter to the measured current, the low-pass filter having a filter factor of 0.5, for example (however, and as discussed in detail above with reference to FIG. 2, the filter factor may be varied based on simulation and/or testing data for a given engine application). The filtered current may be determined during a predetermined window, as approximated by dashed boxes 404 and 454 in the plots 425 and 475, respectively.

As shown in FIGS. 4A and 4B, the detection algorithm may accurately and reproducibly detect an inflection point of the measured current without the relatively low signal-to-noise ratio to which the second derivative of the measured current is susceptible. The inflection point may correspond to a local minimum indicating an inductance change of the exemplary solenoid valve during closing thereof. The closing point being detected with greater accuracy, each of a fuel injection timing, a fuel injection advance angle, and an amount of fuel to be injected may be controlled with correspondingly greater precision.

A method may be provided for determining a closing time or closing point of a solenoid valve in a fuel injector in an engine with greater accuracy. In some examples, an electric current of the solenoid valve may be measured and filtered (e.g., with a low-pass filter) during engine operation, where the filtered electric current may have a relatively high signal-to-noise ratio. An inflection point of the measured electric current may be determined where the filtered electric current is substantially equal to the measured electric current, the inflection point indicating an inductance change of the solenoid valve at the closing time. A technical effect of comparing the measured electric current to the filtered electric current to determine the inflection point and thereby the closing time is that a total number of false positives may be reduced relative to some closing time detection algorithms (e.g., such as closing time detection algorithms based on a second derivative of the measured electric current). Further, through accurate monitoring of the closing time over a life of the solenoid valve, degradation may be indicated in real time through trends in anomalous closing times, and an operator may be notified and/or mitigating actions may be performed.

In one example, a method includes monitoring a current of an electrically-actuated solenoid valve, filtering the current, and determining a closing time of the electrically-actuated solenoid valve based on each of the current and the filtered current. In one embodiment of the method, monitoring the current of the electrically-actuated solenoid valve includes monitoring the current in a predetermined window following opening of the electrically-actuated solenoid valve. In one embodiment of the method, the electrically-actuated solenoid valve is included in an engine. In one embodiment of the method, the method further includes updating a previously determined closing time based on the determined closing time, and adjusting one or more operating conditions of the engine based on the determined closing time. In one embodiment of the method, the current is filtered responsive to one or more of a fueling request being initiated, an engine temperature being within a predetermined temperature range, and a threshold duration having elapsed since last determining the closing time. In one embodiment of the method, the method further includes, responsive to a difference between the determined closing time and an expected closing time being greater than a threshold difference, generating an indication of degradation of the electrically-actuated solenoid valve. In one embodiment of the method, the filtered current has a higher signal-to-noise ratio than a second derivative of the current. In one embodiment of the method, determining the closing time based on each of the current and the filtered current includes determining the closing time at an inflection point of the current responsive to the filtered current being within a threshold difference of the current at the inflection point.

In another example, a method for an engine includes opening a solenoid valve coupled to a current sensor, measuring a current with the current sensor, filtering the current with a low-pass filter, comparing the measured current to the filtered current to determine an inflection point of the measured current, and adjusting one or more engine operating conditions based on the inflection point. In one embodiment of the method, opening the solenoid valve includes applying an actuation voltage to the solenoid valve. In one embodiment of the method, the inflection point indicates an inductance change upon closing of the solenoid valve. In one embodiment of the method, the inflection point is a local minimum. In one embodiment of the method, the solenoid valve is a fuel injection valve in a unit pump fuel injector assembly of the engine. In one embodiment of the method, the one or more engine operating conditions includes one or more of a fuel injection timing, a fuel injection advance angle, and an amount of fuel to be injected. In one embodiment of the method, a filter factor of the low-pass filter is adjusted based on one or more of an application of the engine, a configuration of the engine, and a configuration of the unit pump fuel injector assembly.

In yet another example, a vehicle system includes a fuel injection pump in fluid communication with a fuel injector via a fuel injection valve, a sensor coupled to the fuel injection valve, and a controller communicably coupled to each of the fuel injection pump, the fuel injector, the fuel injection valve, and the sensor, the controller executing instructions in non-transitory memory to receive sampling data from the sensor, process the sampling data with a low-pass filter, determine a closing point of the fuel injection valve based on the processed sampling data, and adjust operation of one or more of the fuel injection pump, the fuel injector, and the fuel injection valve based on the closing point. In one embodiment of the vehicle system, the sensor is a current sensor, wherein the sampling data includes a plurality of current measurements, and wherein processing the sampling data includes inputting each of a current measurement for an nth iteration in a predetermined window and a filtered current measurement for an (n−1)th iteration in the predetermined window into the low-pass filter to obtain a filtered current measurement for the nth iteration. In one embodiment of the vehicle system, determining the closing point includes, for the nth iteration, determining an absolute difference between the current measurement and the filtered current measurement less than a convergence threshold. In one embodiment of the vehicle system, the fuel injector, the fuel injection pump, and the fuel injection valve are included in a diesel internal combustion engine, the fuel injector being fluidly coupled to a cylinder of the diesel internal combustion engine. In one embodiment of a vehicle system, the vehicle system is a rail vehicle.

In another representation, a method includes iteratively performing current sampling of a proportional solenoid valve for a first iteration and a second iteration, wherein the first iteration includes sampling a first current of the proportional solenoid valve, passing the first current of the proportional solenoid valve to a first buffer, and initializing a second buffer based on the first buffer, and wherein the second iteration includes sampling a second current of the proportional solenoid valve, the second current sampled after sampling the first current, updating the first buffer based on the second current, and updating the second buffer by inputting the second buffer and the updated first buffer into a low-pass filter, and responsive to an absolute difference between the updated first buffer and the updated second buffer being less than a convergence threshold, indicating closing of the proportional solenoid valve. In one embodiment of the method, the method further includes, further responsive to the absolute difference between the updated first buffer and the updated second buffer being less than the convergence threshold, ending current sampling of the proportional solenoid valve. In one embodiment of the method, the method further includes, responsive to the absolute difference between the updated first buffer and the updated second buffer being greater than or equal to the convergence threshold, continuing current sampling of the proportional solenoid valve. In one embodiment of the method, the method further includes, responsive to a total number of iterations of current sampling being greater than a sampling threshold, generating an indication of degradation of the proportional solenoid valve. In one embodiment of the method, the proportional solenoid valve is configured to deliver fuel to a fuel injector of a diesel engine. In one embodiment of the method, the diesel engine is a power source for a locomotive. In one embodiment of the method, the method further includes further responsive to the absolute difference between the updated first buffer and the updated second buffer being less than the convergence threshold, incrementing an aging counter, and responsive to the aging counter being greater than a threshold count, generating an indication of degradation of the proportional solenoid valve.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
monitoring, via one or more controllers, a current of an electrically-actuated solenoid valve, wherein the electrically-actuated solenoid valve is included in an engine and the current is a measured current;

filtering, via a low-pass filter, the current, wherein the current is filtered responsive to a fueling request being initiated, an engine temperature being within a predetermined temperature range, and a threshold duration having elapsed since last determining a closing time of the electrically-actuated solenoid; and determining, via the one or more controllers, the closing time of the electrically-actuated solenoid valve based on a comparison of the measured current and the filtered current, the comparison of the measured current and the filtered current comprising determining an absolute difference between the measured current and the filtered current.

2. The method of claim 1, wherein monitoring the current of the electrically-actuated solenoid valve comprises monitoring the current in a predetermined window following opening of the electrically-actuated solenoid valve.

3. The method of claim 1, further comprising:
updating a previously determined closing time based on the determined closing time; and
adjusting one or more operating conditions of the engine based on the determined closing time.

4. The method of claim 1, further comprising, responsive to a difference between the determined closing time and an expected closing time being greater than a threshold difference, generating an indication of degradation of the electrically-actuated solenoid valve.

5. The method of claim 1, wherein the filtered current has a higher signal-to-noise ratio than a second derivative of the current.

6. The method of claim 1, wherein determining the closing time based on a comparison of the measured current and the filtered current comprises determining the closing time at an inflection point of the current responsive to the filtered current being within a threshold difference of the measured current at the inflection point.

7. A method for an engine, the method comprising:
opening a solenoid valve coupled to a current sensor;
measuring a current with the current sensor, the current being a measured current;
filtering the current with a low-pass filter, wherein the current is filtered responsive to a fueling request being initiated, an engine temperature being within a predetermined temperature range, and a threshold duration having elapsed since last determining an inflection point of the measured current;
comparing the measured current to the filtered current to determine the inflection point of the measured current, the comparison of the measured current and the filtered current comprising determining an absolute difference between the measured current and the filtered current; and
adjusting one or more engine operating conditions based on the inflection point.

8. The method of claim 7, wherein opening the solenoid valve comprises applying an actuation voltage to the solenoid valve.

9. The method of claim 7, wherein the inflection point indicates an inductance change upon closing of the solenoid valve.

10. The method of claim 7, wherein the inflection point is a local minimum.

11. The method of claim 7, wherein the solenoid valve is a fuel injection valve in a unit pump fuel injector assembly of the engine.

12. The method of claim 11, wherein the one or more engine operating conditions comprises one or more of a fuel injection timing, a fuel injection advance angle, and an amount of fuel to be injected.

13. The method of claim 11, wherein a filter factor of the low-pass filter is adjusted based on an application of the engine, a configuration of the engine, and a configuration of the unit pump fuel injector assembly.

14. A vehicle system, comprising:
a fuel injection pump in fluid communication with a fuel injector via a fuel injection valve;
a sensor coupled to the fuel injection valve; and
a controller communicably coupled to each of the fuel injection pump, the fuel injector, the fuel injection valve, and the sensor, the controller executing instructions in non-transitory memory to:
receive sampling data from the sensor, the sampling data being measured sampling data;
process the sampling data with a low-pass filter to obtain filtered sampling data, wherein the sampling data comprises a plurality of current measurements and the sampling data is filtered responsive to a fueling request being initiated, an engine temperature being within a predetermined temperature range, and a threshold duration having elapsed since last determining a closing point of the fuel injection valve;
determine the closing point of the fuel injection valve based on a comparison of the measured sampling data and the filtered sampling data, the comparison of the measured sampling data and the filtered sampling data comprising determining an absolute difference between the measured sampling data and the filtered sampling data; and
adjust operation of one or more of the fuel injection pump, the fuel injector, and the fuel injection valve based on the closing point.

15. The vehicle system of claim 14, wherein the sensor is a current sensor; and
wherein processing the sampling data comprises inputting each of a current measurement for an nth iteration in a predetermined window and a filtered current measurement for an (n−1)th iteration in the predetermined window into the low-pass filter to obtain a filtered current measurement for the nth iteration.

16. The vehicle system of claim 15, wherein determining the closing point comprises, for the nth iteration, determining an absolute difference between the current measurement and the filtered current measurement less than a convergence threshold.

17. The vehicle system of claim 14, wherein the fuel injector, the fuel injection pump, and the fuel injection valve are included in a diesel internal combustion engine, the fuel injector being fluidly coupled to a cylinder of the diesel internal combustion engine.

18. The vehicle system of claim 14, wherein the vehicle system is a rail vehicle.

* * * * *